United States Patent
Darke et al.

(10) Patent No.: US 12,190,131 B2
(45) Date of Patent: Jan. 7, 2025

(54) METHOD AND SYSTEM FOR FUNCTION CALL AND VARIABLE ACCESS BASED RELAXED BACKWARD SLICING

(71) Applicant: Tata Consultancy Services Limited, Mumbai (IN)

(72) Inventors: Priyanka Darke, Pune (IN); Shrawan Kumar, Pune (IN); Venkatesh Ramanathan, Pune (IN); Sakshi Agrawal, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 539 days.

(21) Appl. No.: 17/654,427

(22) Filed: Mar. 11, 2022

(65) Prior Publication Data

US 2022/0342680 A1 Oct. 27, 2022

(30) Foreign Application Priority Data

Mar. 25, 2021 (IN) .............................. 202121013172

(51) Int. Cl.
*G06F 9/445* (2018.01)

(52) U.S. Cl.
CPC ................................ *G06F 9/44589* (2013.01)

(58) Field of Classification Search
CPC ............. G06F 9/44589; G06F 11/3604; G06F 11/3668
See application file for complete search history.

(56) References Cited

U.S. PATENT DOCUMENTS

| 2007/0112714 A1* | 5/2007 | Fairweather ............ G06F 8/427 706/46 |
| 2012/0151270 A1* | 6/2012 | Stolfo ................. G06F 11/3652 714/38.1 |

(Continued)

FOREIGN PATENT DOCUMENTS

| CN | 106951366 A | 7/2017 |
| CN | 109885292 A | 6/2019 |
| CN | 113138797 A | 7/2021 |

OTHER PUBLICATIONS

Mock et al., "Program Slicing with Dynamic Points-To Sets", Aug. 2005, IEEE Transactions on Software Engineering, vol. 31, No. 8, pp. 657-678. (Year: 2005).*

(Continued)

*Primary Examiner* — Kenneth Tang
(74) *Attorney, Agent, or Firm* — FINNEGAN, HENDERSON, FARABOW, GARRETT & DUNNER LLP

(57) ABSTRACT

This disclosure relates generally to the field of program slicing, and, more particularly, to a method and system for function call and variable access based relaxed backward slicing. The method discloses a slicing criterion which focuses only on functions called from an entry function. The slicing criteria uses control and data flow information to slice the given entry function with respect to functions called from the body of the entry function and eventually remove all functions not called directly or indirectly from the entry function. The variables modified by calls in the entry function are considered through side-effect while identifying control and data dependence chain within body of entry function. The proposed technique identifies partitions of functions based on the variables accessible in and functions called from the entry function. Thus, unrelated sets of (Continued)

functions with respect to the entry function are computed and divided into different partitions.

18 Claims, 3 Drawing Sheets

(56) References Cited

U.S. PATENT DOCUMENTS

| | | | | |
|---|---|---|---|---|
| 2012/0151449 | A1* | 6/2012 | Maeda | G06F 11/3604 |
| | | | | 717/126 |
| 2012/0174074 | A1* | 7/2012 | Ganai | G06F 8/314 |
| | | | | 717/126 |
| 2012/0254827 | A1* | 10/2012 | Conrad | G06F 8/35 |
| | | | | 717/104 |
| 2014/0173734 | A1* | 6/2014 | Keromytis | G06F 21/566 |
| | | | | 726/23 |
| 2014/0280162 | A1* | 9/2014 | Halpern | G06F 16/22 |
| | | | | 707/737 |
| 2015/0370228 | A1* | 12/2015 | Kohn | B60W 10/06 |
| | | | | 700/287 |
| 2016/0239647 | A1* | 8/2016 | Johnson | G06F 21/125 |
| 2017/0126738 | A1* | 5/2017 | Wilkerson | G06F 21/52 |
| 2017/0185504 | A1* | 6/2017 | Krishnan | G06F 8/75 |
| 2019/0377658 | A1* | 12/2019 | Chimdyalwar | G06F 11/3608 |
| 2020/0210158 | A1* | 7/2020 | Bucuvalas | G06F 8/75 |

OTHER PUBLICATIONS

Husni Khanfar et al., "Static Backward Program Slicing for Safety-Critical Systems", Conference/Workshop Paper, Jun. 2015, Malardalen University, http://www.ipr.mdh.se/pdf_publications/3966.pdf.

* cited by examiner

METHOD AND SYSTEM FOR FUNCTION CALL AND VARIABLE ACCESS BASED RELAXED BACKWARD SLICING

PRIORITY CLAIM

This U.S. patent application claims priority under 35 U.S.C. § 119 to: Indian provisional patent application no. 202121013172, filed on Mar. 25, 2021. The entire contents of the aforementioned application are incorporated herein by reference.

TECHNICAL FIELD

The disclosure herein generally relates to the field of program slicing, and, more particularly, to a method and system for function call and variable access based relaxed backward slicing.

BACKGROUND

Safety critical software requires rigorous verification and analysis criteria to be satisfied to ensure the absence of errors. A scalable analysis of such software has become possible due to slicing. Slicing breaks down a software program into sub-programs or slices. A sub-program is a sound or unsound representation of the original program and can be verified individually to infer the verification result of the entire program. Slicing methods create sub-programs out of software systems solely using data or control flow information of the system. Often precise computation of data and control flow information does not scale. Thus, imprecise analysis is used to scale verification to create sub-programs that can be analyzed individually. One method to create such sub-programs is called clustering.

Existing clustering techniques perform a backward analysis to form clusters of functions. One cluster with respect to function $f$ is a set which includes $f$ and all functions called directly or indirectly from $f$. This way clustering helps to break the large input application into small parts or clusters using function call information. Computing function call information uses the call tree and flow insensitive pointer analysis to resolve function pointers. Thus, it is very light weight and can scale to large applications. Clustering is independent of the properties to be verified and generates exactly one cluster (among others), corresponding to the entry function of the application (or the main function). Once the clusters are formed, each cluster is sliced further into sub-programs to scale up the analysis.

However, this type of clustering is simple in analyzing the program. There is a need to consider data and control flow of the program which scales and improves the precision of the clusters. Another drawback of the existing method is that in most applications, all functions are directly or indirectly called from the main function. So, such clustering technique ends up forming exactly one cluster and is not useful. For example, consider loosely coupled systems, components of these systems are always invoked from the main entry function of the application and so clustering is not useful over such applications. Another existing method generates multiple backward slices at every calling context with respect to an input property to be verified. Creating backward slices with respect to the input property can be expensive as it is inter-procedural, and the slicer analyzes the entire program at once to create the slices.

SUMMARY

Embodiments of the present disclosure present technological improvements as solutions to one or more of the above-mentioned technical problems recognized by the inventors in conventional systems.

For example, in one embodiment, a method for function call and variable access based relaxed backward slicing is provided. The method includes: receiving an input program, a source code having an entry function, wherein the entry function comprises (i) a set of distinct function calls called directly from the entry function and (ii) a set of global variables accessible in the entry function; generating a set of partitions corresponding to the entry function based on a slicing criteria, wherein each partition of the set of partitions comprises one or more functions satisfying the slicing criteria; generating a set of slice points for each of the partition of the set of partitions based on (i) control and data flow information of the entry function and (ii) one or more distinct function calls in the entry function of the set of distinct function calls corresponding to the one or more functions in the corresponding partition; generating a set of program slices with respect to the entry function, wherein each program slice corresponds to at most one set of slice points corresponding to the respective partition; generating a verification result for each program slice of the set of program slices using a verifier tool; and composing a verification result of the input program based on the generated verification result for each program slice.

In another aspect, a system for function call and variable access based relaxed backward slicing is provided. The system comprises memory storing instructions; one or more communication interfaces; and one or more hardware processors coupled to the memory via the one or more communication interfaces, wherein the one or more hardware processors are configured by the instructions to receive an input program, a source code having an entry function, wherein the entry function comprises (i) a set of distinct function calls called directly from the entry function and (ii) a set of global variables accessible in the entry function; generate a set of partitions corresponding to the entry function based on a slicing criteria, wherein each partition of the set of partitions comprises one or more functions satisfying the slicing criteria; generate a set of slice points for each of the partition of the set of partitions based on (i) control and data flow information of the entry function and (ii) one or more distinct function calls in the entry function of the set of distinct function calls corresponding to the one or more functions in the corresponding partition; generate a set of program slices with respect to the entry function, wherein each program slice corresponds to at most one set of slice points corresponding to the respective partition; generate a verification result for each program slice of the set of program slices using a verifier tool; and compose a verification result of the input program based on the generated verification result for each program slice.

In an embodiment, wherein the slicing criteria is applied to (i) the set of distinct function calls, (ii) a set of function bodies corresponding to the set of distinct function calls and (iii) a set of functions called from the set of function bodies.

In an embodiment, wherein the set of functions are called directly or indirectly from the set of distinct function calls.

In an embodiment, wherein the slicing criteria are one or more of:

(i) Intersection of any two one or more functions are null set, and
(ii) Any two one or more functions are independent of each other if
    a. Any two one or more functions are called directly from the entry function then there is no transitive control and transitive data dependence between function calls to the any two one or more functions.

b. Any two one or more functions do not transitively call a same function c. Any two one or more functions do not refer to a same variable in the definition of the any two one or more functions.

In an embodiment, wherein the slicing criteria is applied if a set of conditions are satisfied, wherein the set of conditions are one or more of, a. Each distinct function call of the set of distinct function calls (i) is not a part of any conditional expression (ii) does not occur in a loop and (iii) is encoded either as an independent program statement or occurs on right-hand side expression of an assignment statement b. The entry function (i) is not a part of any recursive call and (ii) does not specify any assertions directly.

In an embodiment, wherein the verification result of the input program is anyone of (i) failure (ii) safe or (iii) unknown.

In yet another aspect, a non-transitory computer readable medium for identifying redundant function-level slicing calls is provided by receiving an input program, a source code having an entry function, wherein the entry function comprises (i) a set of distinct function calls called directly from the entry function and (ii) a set of global variables accessible in the entry function; generating a set of partitions corresponding to the entry function based on a slicing criteria, wherein each partition of the set of partitions comprises one or more functions satisfying the slicing criteria; generating a set of slice points for each of the partition of the set of partitions based on (i) control and data flow information of the entry function and (ii) one or more distinct function calls in the entry function of the set of distinct function calls corresponding to the one or more functions in the corresponding partition; generating a set of program slices with respect to the entry function, wherein each program slice corresponds to at most one set of slice points corresponding to the respective partition; generating a verification result for each program slice of the set of program slices using a verifier tool; and composing a verification result of the input program based on the generated verification result for each program slice.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide method and system for function call and variable access based relaxed backward slicing. The disclosed method is light-weight in terms of memory consumption and can scale well to large amount of data. The method computes the call graph and referenced variables information using call trees and a lightweight flow insensitive pointer analysis respectively. The method discloses a slicing criterion which focuses only on functions called from a given entry function $f$. It uses control and data flow analyses local only to the given entry function $f$ to slice it with respect to functions called from its body and eventually remove all functions not called directly or indirectly from $f$. The variables modified by calls in the entry function are considered through side-effect while identifying control and data dependence chain within body of the entry function. The disclosed technique identifies partitions of functions based on the variables accessible in and functions called from $f$. This way related sets of functions called from function $f$ are computed and divided into different partitions. And the analysis can then be performed with respect to one partition at a time which improves the scalability of the analysis. The method works even if all functions are called from the function $f$. The method analyzes an input program in depth and further understands that each function may not be calling certain functions at all and so they are irrelevant to each other and need not be analyzed together at all. The functions called from the main entry function $f$ may be partitioned and the input properties are analyzed one partition at a time.

Figure 1:
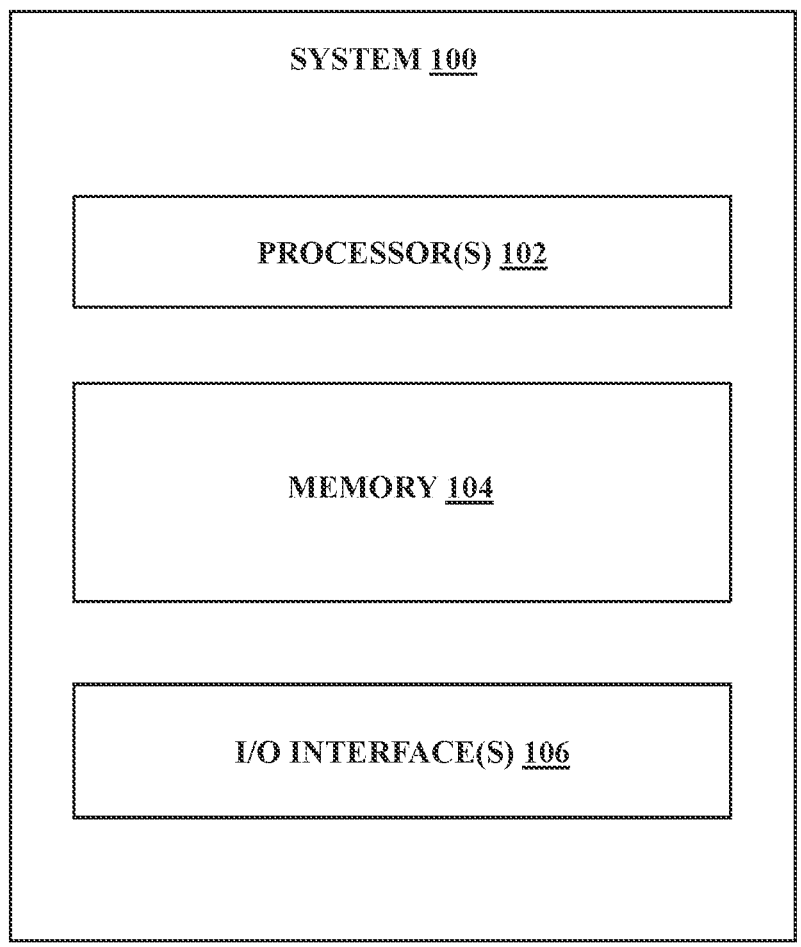
FIG. 1 illustrates an exemplary block diagram of a system for function call and variable access based relaxed backward slicing, in accordance with some embodiments of the present disclosure
Figure 2:
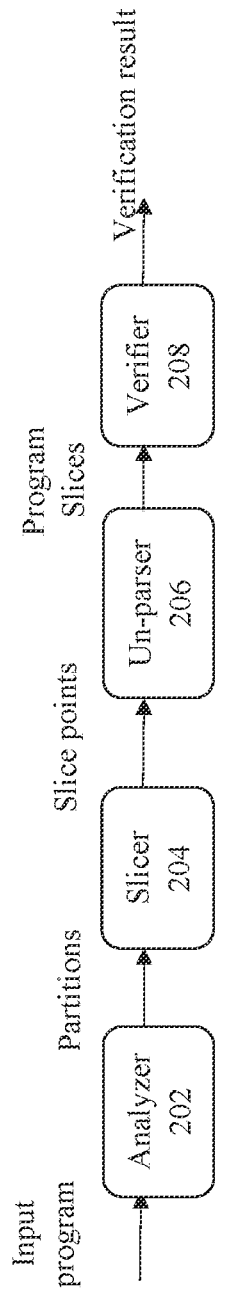
FIG. 2 is an exemplary high-level block diagram for function call and variable access based relaxed backward slicing according to some embodiments of the present disclosure.
Figure 3:
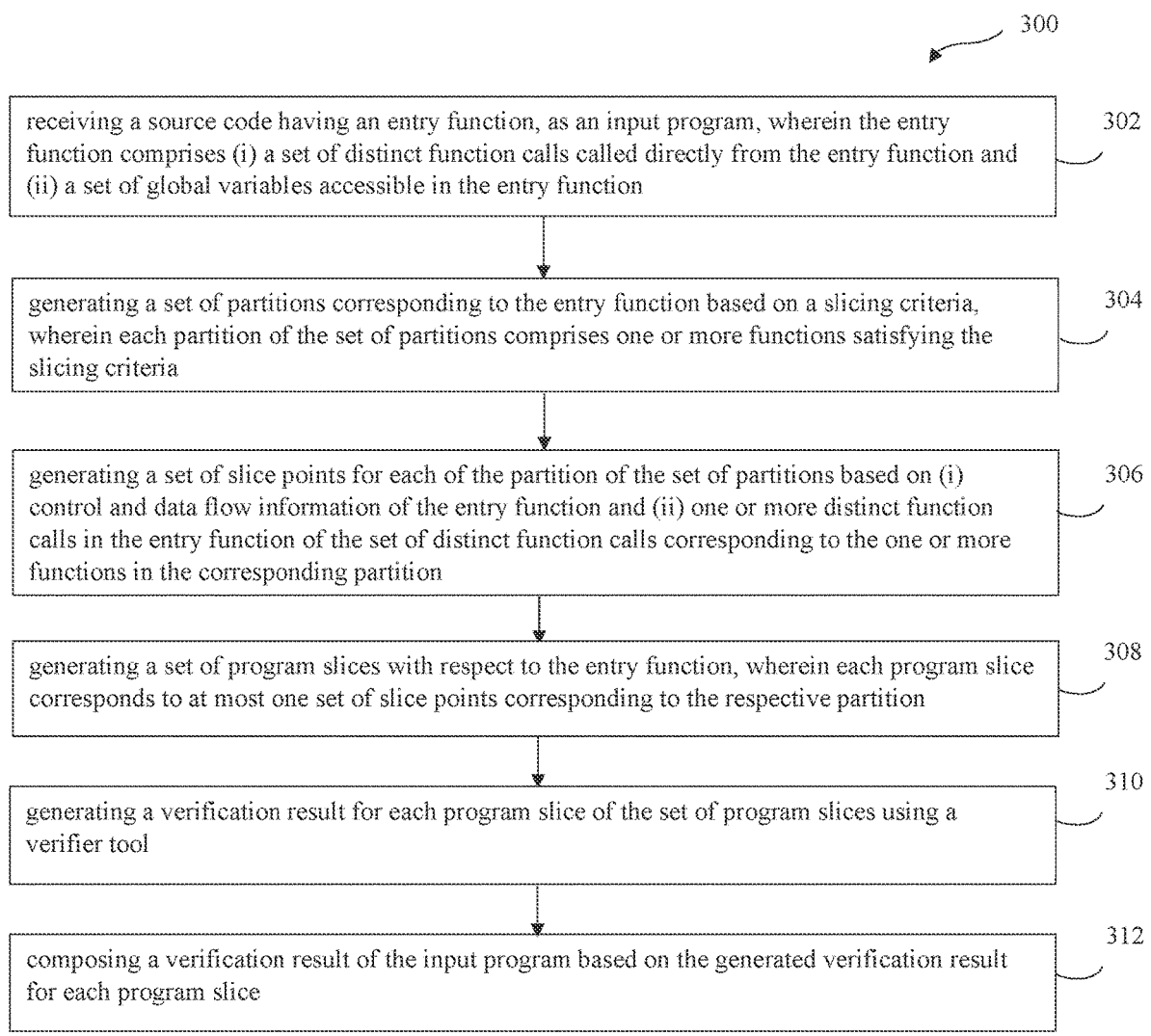
FIG. 3 is an exemplary flow diagram illustrating a method for function call and variable access based relaxed backward slicing according to some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary block diagram of a system 100 for function call and variable access based relaxed backward slicing, according to embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

FIG. 2 is an exemplary high level block diagram of the system 100 for function call and variable access based relaxed backward slicing according to some embodiments of the present disclosure. The working of the method for relaxed backward slicing is explained in conjunction with FIG. 1 and FIG. 2.

The system 100 comprises a component analyzer 202, a component slicer 204, a component un-parser 204 and a component verifier 208. The component analyzer 202 is configured to receive an input program P for slicing. The analyzer generates a set of partitions according to a slicing criteria which is explained later in the description. The component slicer 204 is configured to generate a set of slice points for each partition of the set of partitions. The component un-parser 206 is configured to generate a set of program slices using the partition information and the set of slice points per partition of the component slicer 204. The component verifier 208 is configured to check verification result of the input program by first verifying each program slice and then composing the verification result of each program slice.

FIG. 3 is an exemplary flow diagram illustrating the method for function call and variable access based relaxed backward slicing according to some embodiments of the present disclosure. The steps of the method 300 of the present disclosure will now be explained with reference to the components of the system 100 as depicted in FIG. 1 and the components 202-208 as depicted in FIG. 2 and the flow diagram.

In an embodiment of the present disclosure, the one or more processors 102 are configured to receive at step 302, the input program, a source code having the entry function $f$, wherein the entry function $f$ comprises (i) a set of distinct function calls called directly from the entry function and (ii) a set of global variables accessible in the entry function. The program slices are generated corresponding to the entry function of the input program. Let $FN=\{f_1, f_2, \ldots, f_t\}$ be the distinct functions called directly from $f$ and let the corresponding calls be $C=\{c_1, c_2, \ldots c_n\}$ in the body of function $f$. Let the set $F(f_i)$, $1<=i<=t$, be the union of $f_i$ and the set of functions transitively called from $f_i$. The set $F(f_i)$ for each $f$ is computed using call tree information computed from the code syntax, and flow insensitive pointer analysis to resolve function pointers. Let $V(F(f_i))$, $1<=i<=t$, be a set of all global variables or symbolic memory locations accessible in $f$ and read or modified in at least one function in $F(f_i)$, $1<=i<=t$. The set $V(F(f_i))$ is computed with a light-weight flow insensitive pointer analysis. The functions in $F(f_i)$ may read or modify the same variable, as they belong to the same set of functions invoked from the entry function.

In an embodiment of the present disclosure, the one or more processors 102 are configured to generate at step 304, a set of partitions corresponding to the entry function based on a slicing criteria, wherein each partition of the set of partitions comprises one or more functions satisfying the slicing criteria. The slicing criteria is applied to (i) the set of distinct function calls, (ii) a set of function bodies corresponding to the set of distinct function calls and (iii) a set of functions called from the set of function bodies. The slicing criteria is applied if a set of conditions are satisfied, wherein the set of conditions are one or more of:

a. Each distinct function call of the set of distinct function calls (i) is not a part of any conditional expression (ii) does not occur in a loop and (iii) is encoded either as an independent program statement or occurs on right-hand side expression of an assignment statement.

b. The entry function (i) is not a part of any recursive call and (ii) does not specify any assertions directly.

The slicing criteria are one or more of:

(i) Intersection of any two one or more functions are null set, and (ii) Any two one or more functions are independent of each other if a. Any two one or more functions are called directly from the entry function then there is no transitive control and transitive data dependence between function calls to the any two one or more functions. The variables modified by calls in the entry function are considered through side-effect while identifying control and data dependence chain within body of entry function b. Any two one or more functions do not transitively call a same function c. Any two one or more functions do not refer to a same variable in the definition of the any two one or more functions In an embodiment, the slicing criteria is explained as below: $S=\{S_1, S_2, \ldots, S_r\}$ is the required partition of functions with respect to the entry function $f$, where each $S_i$, $1<=i<=r$, has one or more functions that satisfies the following criteria:

1. $1<=i<=r$, $1<=j<=r$, $i \neq j \rightarrow S_i \cap S_j = \{\ \}$.
2. Size of each $S_i$, $|S_i|$, $1<=i<=r$, is the smallest possible value, or $r$ is the largest possible value
3. All functions $f_i$ in set $S_x$ and $f_j$ in set $S_y$, $1<=x<=r$, $1<=y<=r$, $i \neq j$, are independent of each other. In other words $\forall 1 \le i \le r$, $\forall f_i \in S_x$, $\forall f_j \in S_y$, $f_i$ and $f_j$ are independent of each other. Functions $f_i$ and $f_j$ are independent of each other if (i) They are directly called from $f$ then there is no transitive control and transitive data dependence between calls to $f_i$ and $f_j$ in $f$.

(ii) $f_i$ and $f_j$ do not transitively call the same function (iii) $f_i$ and $f_j$ do not refer to the same variable or symbolic memory location in their definitions If such a partition S exists, the function $f$ is sliced with respect to each set $S_i$, $1<=i<=r$, in the partition. That is, let $D(S_i)$, $1<=i<=e$, be the set of functions in partition $S_i$ which are directly called from $f$ where 'e' is the number of functions in $D(S_i)$ which are called directly from $f$. Therefore $D(S_i)$ is a subset of the set $\{f_1, f_2, \ldots, f_t\}$, functions called directly from $f$. $r$ slices, $P_i$ ($1<=i<=r$), are generated. To create slice $P_i$ the body of the entry function $f$ is sliced with respect to calls to functions in set $D(S_i)$, $1<=i<=e$. Let $f'$ be the sliced body of the entry function $f$ in $P_i$ with respect to calls $D(S_i)$. So, $P_i$ will only have $f'$ and definitions of functions in $F(S_i)$. Here $F(S_i)$ is the union of functions in $F(f_j)$, for each function $f_j$ in partition $S_i$, $1<=j<=t$. Thus, the set of all program slices are generated.

In another embodiment, the slicing criteria can also be explained as given hereafter. Let $S(c')$ be the slice of the body of the entry function with respect to call $c'$ in the entry function. Let the slice be created by considering variables modified by other calls in the entry function through side-effect while identifying control and data dependence chain within body of the entry function. If the definition of $S(C')$ is extended to set of calls C' such that $S(C')=\cup_{c_i \in C'} S(c_i)$. Let $CS(C')$ be the set of calls in $S(C')$. Then the set of function calls C is partitioned into sets $C_1, C_2, \ldots, C_r$ such that $\forall i, j$ $i \in [1, r]$ $j \in [1, r]$ $i \neq j \Rightarrow C_i \cap CS(C_j) = \emptyset$ and r is the maximum possible value. The set $C_i$ is used to compute the corresponding slice $P_i$. Functions in slice $P_i$ consist of the sliced entry function, equivalent to $S(C_i)$, and functions transitively invoked by calls in set $C_i$.

The algorithm to generate the required partitioning is given as below:

$f$: the entry function which indirectly calls all asserts in the program and needs to be sliced. Assume $f$ is not recursive and does not contain calls in loops.

```
FN = {f₁, f₂, ..., f_r}: the set of functions called directly from f.
Algorithm slice (f)
    C = get_calls(f);
    FN = get_dir_called_funcs(f, C);
    //computeNMerge_function_closures(f); and //compute_ref_vars(f)
    for each fn in FN
        C_fn.add(fn);
        C_fn.add(get_all_called_functions(fn))
        Add_to_fn_table(C_fn, fn);
        V_fn.add(get_all_transitively_ref_global_vars(fn))
        Add_to_var_table(V_fn, fn);
    End for
        for each fn1 in fn_table
            c1 = getCall(C, fn1)
            C_fn1 = get_fns(fn1)
            v_fn1 = get_vars(fn1)
            for each fn2 in fn_table
                c2 = getCall(C, fn2)
                C_fn2 = get_fns(fn2)
                v_fn2 = get_vars(fn2)
                if(intersection(C_fn1, C_fn2)!=null ||
                data_or_control_dependent_in(c1, c2, f) ||
                intersection(v_fn1, v_fn2) != null)
                    C_fn1 = Merge(C_fn1, C_fn2);
                    v_fn1 = Merge(v_fn1, v_fn2);
                    Remove_from_fn_table(C_fn2, fn2);
                    Remove_from_var_table(v_fn2, fn2);
                //called_fns_ends – analyzer ends
            End inner for
        End outer for
        //slice + unparse f
    for each fn in fn_table
        S = fn_level_slice(fn, f);
        unparse(S, get_fns(fn));
    End for
```

The above algorithm first computes direct calls 'C' in the body of function $f$. The algorithm then translates these calls into the set of corresponding functions directly called from $f$ and stores them into the set FN. For every function fn in FN, it computes the set of functions called directly or indirectly from it, and the set of global variables accessible in $f$ and referred (read or modified) by any of the functions directly or indirectly called by fn. For this the algorithm uses the symbol table and any known pointer analysis. Then it creates a table called fn_table which contains an entry of the function fn against the set of functions called directly or indirectly from it. It stores the variable information computed as an entry into a table called var_table against the corresponding function fn.

It then compares every function fn1 in the table fn_table with every other function fn2 in fn_table. The comparison is given by (i) If there is an intersection of the functions called by fn1 and fn2 or (ii) if their corresponding calls in $f$ are data or control dependent in the body of $f$, or (iii) if any two entries in the var_table refer to any same variable; if any of the 3 conditions hold, then it merges their entries in fn_table and var_table to satisfy the slicing criteria explained earlier. It computes the control and data dependence between calls using any known procedure over data and control flow graphs limited to the body of function $f$ to keep it light weight.

In an embodiment of the present disclosure, the one or more processors 102 are configured to generate at step 306, a set of slice points for each of the partition of the set of partitions based on (i) control and data flow information of the entry function which takes into account the knowledge of a set of variables read or modified by distinct function calls in the body of the entry function and (ii) one or more distinct function calls in the entry function of the set of distinct function calls corresponding to the one or more functions in the corresponding partition. The two steps described above in the algorithm produce an fn_table which satisfies the slicing criteria. Further the slicer 204 is called by the system 100 for every function, fn, in the fn_table to generate slice points with respect to the body of $f$ and each call corresponding to fn in the body of the entry function $f$. This slicing uses data and control flow information local to the body of the entry function $f$, and variables modified by calls in $f$ through side-effect while identifying control and data dependence chain within body of $f$, to slice $f$ and create all slice points in $f$ which will be present in the respective sliced program.

In an embodiment of the present disclosure, the one or more processors 102 are configured to generate at step 308, a set of program slices with respect to the entry function, wherein each program slice corresponds to at most one set of slice points corresponding to the respective partition. The slice points for each function in fn_table are passed to the un-parser 206 which generates a sliced program which contains the body of the entry function $f$ sliced with respect to (i) all calls to function fn in $f$ and (ii) calls to all functions in fn_table corresponding to fn directly called in $f$, and all the definitions of functions in fn_table corresponding to fn. This is done for every entry in the fn_table.

Consider the example of an input program, code1 given below

```
void main ( ) {
    b=30, c =10;
    if (!a) f1 ( );
    else if(b) f2 ( );
    ...
}
f1 ( ){c ++;}
f2 ( ){b =0; assert (b);}
```

One slice slice1 from code 1, is given as below

```
void main ( ) {
    b=30 , c =10;
```

```
        if (!a);
        else if(b) f2 ( );
        ...
    }
    f2 ( ){b =0; assert (b);}
```

Function main has been sliced with respect to the call to ƒ2 in slice1 which contains the error. Function ƒ1 need not be analyzed to find the error. This type of slicing is helpful in analyzing large code in which the verifier 208 may run out of resources while analyzing an irrelevant function like ƒ1.

In an embodiment of the present disclosure, the one or more processors 102 are configured to generate at step 310, a verification result for each program slice of the set of program slices using a verifier tool.

In an embodiment of the present disclosure, the one or more processors 102 are configured to compose at step 312, a verification result of the input program based on the generated verification result for each program slice. The results of each program slice are composed to compute R. The verification result of the input program, by the verifier 208 is as follows: if an error trace is realized for any program slice, then R is set to failure; if all program slices are proved to be safe, then R is set to safe; otherwise if none of the program slices are found to be erroneous and there exists a program slice that could not be verified, then R is set to unknown.

EXPERIMENTAL RESULTS: For experimentation, slicer-analyzer which is a limited version of the proposed slicing technique is considered. The proposed slicing technique as implemented in a verification tool called VeriAbs (Version 1.4.2) and the VeriAbs that implemented only slicer-analyzer (Version 1.4.1) were compared. Version 1.4.1 generated slices for only 671 programs whereas version 1.4.2 generated slices for 1323 programs. Due to the proposed slicing technique, version 1.4.2 ran out of time on 8% fewer programs and took approximately 4% lesser time overall as compared to version 1.4.1. While the proposed slicing technique may take more time to slice programs, its unique combination with the slicer-analyzer allows VeriAbs to spend overall less time in generating slices for verification.

The disclosed slicing method focuses only on functions called from a given (entry) function. It uses control- and data-flow analyses local only to the given function to slice it with respect to calls in its body. The disclosed slicing considers variables modified by calls in the entry function through side-effect while identifying control and data dependence chain within body of entry function. This in turn removes all functions not called from the entry function. The disclosed slicing technique produces slices with respect to functions defined in the input program and called from the entry function. The disclosed slicing technique is relaxed which signifies that it in some cases it can produce more set of codes in the respective slices than any known backward slicing techniques.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
   receiving, via one or more hardware processors, an input program, a source code having an entry function, wherein the entry function comprises (i) a set of distinct function calls called directly from the entry function and (ii) a set of global variables accessible in the entry function;
   generating, via the one or more hardware processors, a set of partitions corresponding to the entry function based on a slicing criteria, wherein each partition of the set of partitions comprises one or more functions satisfying the slicing criteria;
   generating, via the one or more hardware processors, a set of slice points for each of the partition of the set of partitions based on (i) control and data flow information of the entry function and (ii) one or more distinct function calls in the entry function of the set of distinct function calls corresponding to the one or more functions in the corresponding partition;
   generating, via the one or more hardware processors, a set of program slices with respect to the entry function, wherein each program slice corresponds to at most one set of slice points corresponding to the respective partition;
   generating, via the one or more hardware processors, a verification result for each program slice of the set of program slices using a verifier tool; and
   composing, via the one or more hardware processors, a verification result of the input program based on the generated verification result for each program slice.

2. The method of claim 1, wherein the slicing criteria is applied to (i) the set of distinct function calls, (ii) a set of function bodies corresponding to the set of distinct function calls and (iii) a set of functions called from the set of function bodies.

3. The method of claim 2, wherein the set of functions are called directly or indirectly from the set of distinct function calls.

4. The method of claim 1, wherein the slicing criteria are one or more of:
   (i) Intersection of any two one or more functions are null set, and
   (ii) Any two one or more functions are independent of each other if
      a. Any two one or more functions are called directly from the entry function then there is no transitive control and transitive data dependence between function calls to the any two one or more functions;
      b. Any two one or more functions do not transitively call a same function
      c. Any two one or more functions do not refer to a same variable in the definition of the any two one or more functions.

5. The method of claim 1, wherein the slicing criteria is applied if a set of conditions are satisfied, wherein the set of conditions are one or more of,
   a. Each distinct function call of the set of distinct function calls (i) is not a part of any conditional expression (ii) does not occur in a loop and (iii) is encoded either as an independent program statement or occurs on right-hand side expression of an assignment statement
   b. The entry function (i) is not a part of any recursive call and (ii) does not specify any assertions directly.

6. The method of claim 1, wherein the verification result of the input program is anyone of (i) failure (ii) safe or (iii) unknown.

7. A system, comprising:
   a memory storing instructions;
   one or more communication interfaces; and
   one or more hardware processors coupled to the memory via the one or more communication interfaces, wherein the one or more hardware processors are configured by the instructions to:
      receive an input program, a source code having an entry function, wherein the entry function comprises (i) a set of distinct function calls called directly from the entry function and (ii) a set of global variables accessible in the entry function;
      generate a set of partitions corresponding to the entry function based on a slicing criteria, wherein each partition of the set of partitions comprises one or more functions satisfying the slicing criteria;
      generate a set of slice points for each of the partition of the set of partitions based on (i) control and data flow information of the entry function and (ii) one or more distinct function calls in the entry function of the set of distinct function calls corresponding to the one or more functions in the corresponding partition;
      generate a set of program slices with respect to the entry function, wherein each program slice corresponds to at most one set of slice points corresponding to the respective partition;
      generate a verification result for each program slice of the set of program slices using a verifier tool; and
      compose a verification result of the input program based on the generated verification result for each program slice.

8. The system of claim 6, wherein the slicing criteria is applied to (i) the set of distinct function calls, (ii) a set of function bodies corresponding to the set of distinct function calls and (iii) a set of functions called from the set of function bodies.

9. The system of claim 8, wherein the set of functions are called directly or indirectly from the set of distinct function calls.

10. The system of claim 7, wherein the slicing criteria are one or more of:
    (i) Intersection of any two one or more functions are null set, and
    (ii) Any two one or more functions are independent of each other if
       a. Any two one or more functions are called directly from the entry function then there is no transitive control and transitive data dependence between function calls to the any two one or more functions;
       b. Any two one or more functions do not transitively call a same function
       c. Any two one or more functions do not refer to a same variable in the definition of the any two one or more functions.

11. The system of claim 7, wherein the slicing criteria is applied if a set of conditions are satisfied, wherein the set of conditions are one or more of,
   a. Each distinct function call of the set of distinct function calls (i) is not a part of any conditional expression (ii) does not occur in a loop and (iii) is encoded either as an independent program statement or occurs on right-hand side expression of an assignment statement
   b. The entry function (i) is not a part of any recursive call and (ii) does not specify any assertions directly.

12. The system of claim 7, wherein the verification result of the input program is anyone of (i) failure (ii) safe or (iii) unknown.

13. One or more non-transitory machine readable information storage mediums comprising one or more instructions, which when executed by one or more hardware processors causes a method for:
   receiving an input program, a source code having an entry function, wherein the entry function comprises (i) a set of distinct function calls called directly from the entry function and (ii) a set of global variables accessible in the entry function;
   generating a set of partitions corresponding to the entry function based on a slicing criteria, wherein each partition of the set of partitions comprises one or more functions satisfying the slicing criteria;
   generating a set of slice points for each of the partition of the set of partitions based on (i) control and data flow information of the entry function and (ii) one or more distinct function calls in the entry function of the set of distinct function calls corresponding to the one or more functions in the corresponding partition;
   generating a set of program slices with respect to the entry function, wherein each program slice corresponds to at most one set of slice points corresponding to the respective partition;
   generating a verification result for each program slice of the set of program slices using a verifier tool; and
   composing a verification result of the input program based on the generated verification result for each program slice.

14. The one or more non-transitory machine-readable information storage mediums of claim 13, wherein the slicing criteria is applied to (i) the set of distinct function calls, (ii) a set of function bodies corresponding to the set of distinct function calls and (iii) a set of functions called from the set of function bodies.

15. The one or more non-transitory machine-readable information storage mediums of claim 14, wherein the set of functions are called directly or indirectly from the set of distinct function calls.

16. The one or more non-transitory machine-readable information storage mediums of claim 13, wherein the slicing criteria are one or more of:
   (i) Intersection of any two one or more functions are null set, and
   (ii) Any two one or more functions are independent of each other if
      a. Any two one or more functions are called directly from the entry function then there is no transitive control and transitive data dependence between function calls to the any two one or more functions;
      b. Any two one or more functions do not transitively call a same function
      c. Any two one or more functions do not refer to a same variable in the definition of the any two one or more functions.

17. The one or more non-transitory machine-readable information storage mediums of claim 13, wherein the slicing criteria is applied if a set of conditions are satisfied, wherein the set of conditions are one or more of,
   a. Each distinct function call of the set of distinct function calls (i) is not a part of any conditional expression (ii) does not occur in a loop and (iii) is encoded either as an independent program statement or occurs on right-hand side expression of an assignment statement
   b. The entry function (i) is not a part of any recursive call and (ii) does not specify any assertions directly.

18. The one or more non-transitory machine-readable information storage mediums of claim 13, wherein the verification result of the input program is anyone of (i) failure (ii) safe or (iii) unknown.

* * * * *